United States Patent [19]

Martin et al.

[11] Patent Number: 5,264,027
[45] Date of Patent: Nov. 23, 1993

[54] DETERGENT RESISTANT COMPOSITIONS

[75] Inventors: Eugene R. Martin, Onsted; Andrew J. Conti, Adrian, both of Mich.

[73] Assignee: Wacker Silicones Corporation, Adrian, Mich.

[21] Appl. No.: 927,999

[22] Filed: Aug. 11, 1992

[51] Int. Cl.$^5$ ............................................. C09G 1/04
[52] U.S. Cl. .................................. 106/3; 106/287.13; 106/287.14; 106/287.16
[58] Field of Search ............... 106/3, 287.13, 287.14, 106/287.16

[56] References Cited

U.S. PATENT DOCUMENTS

| | | | |
|---|---|---|---|
| 3,306,869 | 2/1967 | Lahr et al. | 106/10 |
| 3,960,575 | 6/1976 | Martin | 106/10 |
| 4,273,584 | 6/1981 | D'Angelo et al. | 106/3 |
| 4,324,712 | 4/1982 | Naughn, Jr. | 106/287.13 |
| 4,462,828 | 7/1984 | Otsuki | 106/3 |
| 4,648,904 | 3/1987 | De Pasquale et al. | 106/2 |
| 5,174,813 | 12/1992 | Cifuentes et al. | 106/3 |

*Primary Examiner*—Helene Klemanski

[57] ABSTRACT

Detergent resistant compositions comprising an aqueous emulsion of hydrocarbonoxy end-blocked branched organopolysiloxanes containing from 10 to 99 mol percent of $R_2SiO$ units and from 90 to 1 mol percent of $R_3SiO_{3/2}$ units and/or $SiO_{4/2}$ units, where R is a monovalent hydrocarbon radical. Other silicone fluids such as aminofunctional, silicone fluids, organoalkoxysilanes, silicone resins, organopolysiloxane fluids and silicone gums as well as abrasive materials, surfactants and organic solvents may be incorporated in the aqueous emulsions.

13 Claims, No Drawings

DETERGENT RESISTANT COMPOSITIONS

This invention relates to compositions and more particularly to improved polish compositions which are resistant to detergents.

BACKGROUND OF THE INVENTION

Detergent resistant polishes based on waxes dissolved in a solvent or as aqueous emulsions and containing organopolysiloxanes having amine groups linked thereto are well known in the art. For example, U.S. Pat. No. 3,508,933 to Yates describes an automobile polish which contains the reaction product of a hydroxyl end-blocked polydimethylsiloxane and an aminoalkoxysilane. Also, U.S. Pat. No. 3,544,498 to Holdstock et al., describes a detergent resistant polish containing a partial amine salt of a copolymer which is obtained from the partial hydrolysis and condensation of a silanol end-blocked polydimethylsiloxane having 5 siloxy units, an aminoalkyltrialkoxysilane and an aminoalkoxyalkyltrialkoxysilane and a copolymer obtained from the partial hydrolysis and condensation of a silanol end-blocked polydimethylsiloxane having 800 dimethylsiloxy units with an aminoalkoxyalkenyltrialkoxysilane.

Polish compositions containing mixtures of hydroxyl terminated organopolysiloxanes and organopolysiloxanes containing amine groups, have been known and described in the art. For example, U.S. Pat. No. 3,817,889 to Fink et al., describes a detergent resistant composition containing hydroxyl terminated organopolysiloxanes and methylsiloxanes having amine groups linked to the silicon atoms of the organopolysiloxane through an oxygen atom.

A silicone emulsion polish is described in U.S. Pat. No. 4,743,698 to Hill et al., having a continuous oil phase containing a linear polydiorganosiloxane containing terminal alkoxy groups and a discontinuous phase containing a polydiorganosiloxane-polyoxyalkylene copolymer.

Martin discloses in U.S. Pat. No. 3,960,575 a detergent resistant polish containing an aminofunctional silicone fluid and a hydroxyl end-blocked organopolysiloxane, in which the aminofunctional silicone fluid is obtained from the equilibration of cyclic siloxanes and an aminofunctional silane or siloxane.

U.S. Pat. No. 4,273,584 to D'Angelo et al., discloses a detergent resistant composition containing a blend of a hydroxy terminated polydimethylsiloxane, an aminopolysilane and optionally a partially hydrolyzed organotrialkoxysilane.

Durable silicone emulsion polishes are described in U.S. Pat. No. 4,600,436 to Traver et al., in which an aminofunctional silicone emulsion obtained by emulsion polymerization of (a) water, (b) an emulsifier, (c) a diorganopolysiloxane fluid, (d) an aminofunctional silane, (e) an alkyltrialkoxysilane and (f) a polymerization catalyst is admixed with a silicone emulsion containing (a) a diorganopolysiloxane polymeric fluid having a viscosity of from about 50 to 100,000 centipoise at 25° C., (b) water and (c) an emulsifier.

It has been found that compositions containing alkoxy end-blocked branched diorganopolysiloxanes provide a more durable coating on hard substrates and are more detergent resistant than compositions containing aminofunctional organopolysiloxanes.

Therefore, it is an object of the present invention to provide a detergent resistant composition. Another object of the present invention is to provide a polish composition having a more durable coating. Still another object of the present invention is to provide a polish emulsion which is detergent resistant.

SUMMARY OF THE INVENTION

The foregoing objects and others which will become apparent from the following description are accomplished in accordance with this invention, generally speaking, by providing a composition containing (1) hydrocarbonoxy end-blocked branched organopolysiloxanes, and (2) optionally, ingredients selected from the group consisting of (a) waxes, (b) abrasive, (c) organic solvent, (d) silicone additives, (e) surfactant and (f) thickening agent, and (3) water, in which the surfactant (e) is present in an amount of at least 0.5% by weight based on the weight of the composition.

DESCRIPTION OF THE INVENTION

The hydrocarbonoxy end-blocked branched organopolysiloxanes contain units of the formula $R_2SiO$ ("D" units), $RSiO_{3/2}$ ("T" units) and $SiO_{4/2}$ ("Q" units) where R is a monovalent hydrocarbon radical having from 1 to 18 carbon atoms. The hydrocarbonoxy end-blocked branched organopolysiloxanes contain from 10 to 99 mol percent of "D" units and from 90 to 1 mol percent of "T" and/or "Q" units and more preferably from 15 to 80 mol percent of "D" units and from 85 to 20 mol percent of "T" and/or "Q" units. The mol percent of "T" and "Q" units in the hydrocarbonoxy end-blocked organopolysiloxanes ranges from 90 to 0 to 0 to 90 and more preferably from 0 to 75 to 75 to 0, with the proviso that at least one "T" unit and/or one "Q" unit is present in the organopolysiloxane.

The hydrocarbonoxy end-blocked branched organopolysiloxanes may be further represented by the formula

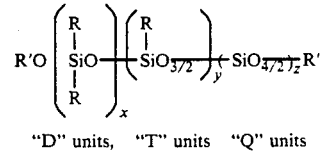

"D" units, "T" units "Q" units where R is the same as above, R' is a monovalent hydrocarbon radical having from 1 to 18 carbon atoms and x has a value of from 10 to 1000, preferably from 10 to 100, y has a value of from 0 to 1000, preferably from 0 to 100, z has a value of from 0 to 1000, preferably from 0 to 100, with the proviso that y+z must be equal to at least 1.

Examples of radicals R and R' are alkyl radicals, such as the methyl, ethyl, n-propyl, iso-propyl, 1-n-butyl, 2-n-butyl, iso-butyl, tert-butyl, n-pentyl, iso-pentyl, neopentyl and tert-pentyl radicals; hexyl radicals such as the n-hexyl radical; heptyl radicals, such as the n-heptyl radical; octyl radicals, such as the n-octyl radical and iso-octyl radicals, such as the 2,2,4-trimethylpentyl radical; nonyl radicals, such as the n-nonyl radical; decyl radicals, such as the n-decyl radical; dodecyl radicals, such as the n-dodecyl radical; octadecyl radicals, such as the n-octadecyl radical; alkenyl radicals such as the vinyl, allyl, and ethylallyl radicals; cycloalkyl radicals, such as the cyclopentyl, cyclohexyl and cycloheptyl radicals and methylcyclohexyl radicals; aryl radicals, such as the phenyl, naphthyl, anthryl and phenanthryl radicals; alkaryl radicals, such as o-, m- and p-tolyl radicals, xylyl radicals and ethylphenyl radicals; and aralkyl radicals, such as the benzyl radical and the α- and β-phenylethyl radicals. The methyl and ethyl radicals are the preferred R and R' radicals.

The hydrocarbonoxy end-blocked branched organopolysiloxanes may be prepared by reacting an organohydrocarbonoxysilane with a hydroxyl terminated organopolysiloxane in the presence of an equilibration catalyst.

The organohydrocarbonoxysilane may be represented by the formula $R_nSi(OR')_{4-n}$ where R and R' are the same as above and n is 0 or 1.

Examples of organohydrocarbonoxysilanes are methyltrimethoxysilane, methyltriethoxysilane, methyltripropoxysilane, methyltributoxysilane, methyltripentoxysilane, methyltrihexoxysilane, methyltrioctoxysilane, methyltridecoxysilane, methyltrioctadecoxysilane, ethyltrimethoxysilane, ethyltriethoxysilane, ethyltripropoxysilane, ethyltributoxysilane, ethyltrihexoxysilane, ethyltridecoxysilane, propyltrimethoxysilane, propyltriethoxysilane, propyltripropoxysilane, propyltributoxysilane, propyltrihexoxysilane, propyltrioctoxysilane, propyltridecoxysilane, butyltrimethoxysilane, butyltriethoxysilane, butyltripropoxysilane, butyltributoxysilane, butyltrihexoxysilane, butyltrioctoxysilane, pentyltrimethoxysilane, pentyltriethoxysilane, hexyltrimethoxysilane, hexyltriethoxysilane, hexyltripropoxysilane, hexyltributoxysilane, hexyltrihexoxysilane, hexyltrioctoxysilane, octyltrimethoxysilane, octyltriethoxysilane, octyltripropoxysilane, octyltributoxysilane, octyltrihexoxysilane, tetraethylorthosilicate, tetrapropylorthosilicate, tetrabutoxyorthosilicate and the like. Preferably, the organohydrocarbonoxy silanes are methyltrimethoxysilane, methyltriethoxysilane, methyltributoxysilane, ethyltrimethoxysilane, ethyltriethoxysilane, ethyltributoxysilane, tetraethylorthosilicate and tetrapropylorthosilicate.

Hydroxyl terminated organopolysiloxanes which may be employed in the equilibration are linear organopolysiloxane fluids of the general formula

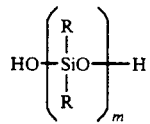

where R is the same as above and m is a number of from 6 to 1000. Generally these organopolysiloxanes have an R to Si ratio of from about 1.8 to 2.1 R groups per silicon atom.

These organopolysiloxane fluids are prepared by the usual methods known in the art for preparing organopolysiloxane fluids.

The viscosity of the organopolysiloxane fluids may range from about 5 to about 20,000 mPa·s at 25° C. and more preferably from about 500 to 10,000 mpa·s at 25° C.

Examples of suitable hydroxyl terminated organopolysiloxanes which may be employed are diorganopolysiloxanes such as dimethylpolysiloxanes, diethylpolysiloxanes, dipropylpolysiloxanes, dibutylpolysiloxanes, methylvinylpolysiloxanes, diphenylpolysiloxanes, methylethylpolysiloxanes, methylphenylpolysiloxanes and copolymers of dimethylmethylphenylpolysiloxanes and dimethyldiphenylsiloxanes and dimethylmethylvinylpolysiloxanes and the like.

Catalysts which may be employed in the equilibration are basic catalysts which have been employed or could have been employed heretofore to promote the condensation of Si-bonded hydroxyl groups with Si-bonded alkoxy groups, or the rearrangement or "equilibration" of siloxane compounds. Examples of basic catalysts which may be employed are alkali metal hydroxides. Other basic catalysts are alkali metal alcoholates, such as potassium methoxide. The alkali metal may be lithium, sodium, potassium, rubidium or cesium, with sodium and potassium being the preferred alkali metals. Other examples of suitable catalysts are potassium methylsiliconate and basic quaternary ammonium compounds such as tetramethylammoniumsiloxanolate obtained from tetramethylammoniumhydroxide and octamethylcyclotetrasiloxane.

It is possible to use a single type of basic catalyst or a mixture containing at least two different types of basic catalysts, for example, a mixture of sodium hydroxide and potassium ethylate.

The amount of catalyst used may be varied over a wide range and the particular amount will vary depending upon the nature of the catalyst. For example, basic catalysts are preferably employed in relatively low concentrations, such as from about 0.005 to 3% by weight and more preferably from about 0.2 to 1% by weight based on the weight of the organosilicon compounds.

For better distribution of the catalysts in the organosilicon compounds to be equilibrated, the equilibration catalysts may be used in the form of a solution in an inert solvent, i.e., solvents which do not react with the catalysts and the organosilicon compounds at the temperature used for the equilibration. Generally, these solutions contain from 20 to 60% by weight of the equilibration catalysts. Examples of suitable solvents which may be employed are hydrocarbons, such as benzene, toluene, xylene and petroleum ether; halogenated hydrocarbons, such as methylenechloride, perchloroethylene and chlorobenzene; ethers, such as diethylether and dibutylether; as well as methylisobutyl ketone.

The equilibration preferably takes place at 50° C. to 175° C, and more preferably from 100° C. to 150° C. The pressure applied for this is generally atmospheric, i.e., about 760 mm.Hg (absolute). The alcohol which is formed during equilibration by condensation of Si-bonded hydroxyl groups and Si-bonded alkoxy groups can be removed by conducting air or nitrogen through the reaction mixture. The equilibration generally takes from four to eight hours. If desired, the equilibration can be carried out in an inert solvent, for instance one of the above solvents.

The catalyst may be neutralized or destroyed by heat, although this is not necessary. Preferably the catalyst is neutralized so that the resultant organopolysiloxanes are more stable over long periods of time.

The amount of hydrocarbonoxy end-blocked branched organopolysiloxanes used in the polish composition of this invention may range from 0.5 to 20% by weight and more preferably from about 1 to 10% by weight based on the weight of the polish composition.

Other ingredients which are present in the polish composition are silicone fluids and/or surfactants.

Examples of silicone fluids which may be present in the polish composition are organopolysiloxane fluids, cyclic organopolysiloxanes, aminofunctional organopolysiloxanes, silicone resins and silicone gums.

The organopolysiloxane fluids may be represented by the general formula

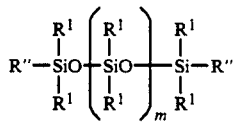

where $R^1$ is R or a fluorinated hydrocarbon having from 1 to 18 carbon atoms and m is the same as above and R" represents a group of the formula R'''O or R, where R''' is hydrogen or R.

The examples of R and R''' radicals are the same as the examples for the R radicals mentioned above. When R" is a group of the formula R'''O, and R''' is R, then R preferably has from 1 to 6 carbon atoms.

Examples of fluorinated hydrocarbon radicals represented by $R^1$ are fluoroethyl, 3-fluoropropyl, 3,3,3-trifluoropropyl, 5,5,5,4,4,3,3-heptafluoropentyl, fluorophenyl, difluorophenyl and trifluorotolyl radicals.

These organopolysiloxane fluids may be triorganosiloxy end-blocked diorganopolysiloxanes, hydroxyl end-blocked diorganopolysiloxanes or alkoxy end-blocked diorganopolysiloxanes.

The diorganopolysiloxanes may be homopolymers or copolymers which are known in the art. Examples of such siloxanes are dimethylsiloxanes, diethylsiloxanes, methylphenylsiloxanes, phenylethylsiloxanes, ethylmethylsiloxanes, methylvinylsiloxanes and copolymers thereof.

The viscosity of the organopolysiloxane fluids may range from 2 to 100,000 mPa·s at 25° C. and more preferably from about 5 to 60,000 mPa·s at 25° C.

These organopolysiloxane fluids are known in the art and their methods of preparation are described in the literature.

Cyclic siloxanes which may be employed in the polishes of this invention are represented by the general formula $(R_2SiO)_y$ where R is the same as above and y is a number of from 4 to 12.

Examples of suitable cyclic siloxanes are octamethylcyclotetrasiloxane, 1,2,3,4-tetramethyl-1,2,3,4-tetravinylcyclotetrasiloxane, 1,2,3,4-tetramethyl-1,2,3,4-tetraphenylcyclotetrasiloxane, octaethylcyclotetrasiloxane, octapropylcyclotetrasiloxane, octabutylcyclotetrasiloxane, decamethylcyclopentasiloxane, dodecamethylcyclohexasiloxane, tetradecamethylcycloheptasiloxane, hexadecamethylcyclooctasiloxane, eicosamethylcyclodecasiloxane and the like.

Aminofunctional organopolysiloxanes which may be employed in the polishes of this invention may be prepared in accordance with the procedure described in U.S. Pat. No.3,890,269 to Martin in which an organopolysiloxane is equilibrated with aminofunctional silanes or siloxanes in the presence of a catalyst. Organopolysiloxanes which may be used in the equilibration process are cyclic siloxanes such as hexamethylcyclotrisiloxane and octamethylcyclotetrasiloxane.

Examples of suitable aminofunctional silanes which may be employed are β-aminopropyltrimethoxysilane, β-aminopropyltriethoxysilane, γ-aminopropyltrimethoxysilane, γ-aminopropyltriethoxysilane, methyl-β-(aminoethyl)-γ-aminopropyldimethoxysilane, ω-aminohexyltributoxysilane, β-(aminoethoxy)propyltrimethoxysilane, β-(aminoethoxy)hexyltriethoxysilane and siloxanes thereof.

The equilibration reactions are conducted in the presence of basic catalysts at a temperature of from about 25° C. up to about 200° C., preferably in an inert atmosphere.

Aminofunctional organopolysiloxanes may be prepared by reacting aminofunctional silanes with hydroxyl terminated dimethylpolysiloxanes in the appropriate molar amounts and thereafter heating the resultant mixture to a temperature of from 100° C. to 200° C. Aminofunctional organopolysiloxanes may also be prepared in accordance with U.S. Pat. No. 2,947,771 to Bailey, by heating cyclic siloxanes with aminoalkylsilicon compounds in the presence of sodium or potassium hydroxide or silanolate derivatives thereof.

The aminofunctional organopolysiloxanes employed in the polishes of this invention preferably have a viscosity of from about 50 to 100,000 mPa·s and more preferably from about 100 to 50,000 mPa·s at 25° C.

Other silicone additives which may be incorporated in the polishes of this invention are silicone resins having the general formula

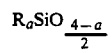

where R is the same as above and a is an average of from about 0.8 to 1.8 and more preferably from about 1 to 1.6. Preferably about 85% of the R groups are methyl or phenyl radicals and at least 50% of the R groups are methyl radicals.

The silicone resins may be either MQ resins, that is resins containing $R_3SiO_{\frac{1}{2}}$ and $SiO_{4/2}$ units or T resins, such as those containing $RSiO_{3/2}$ units, where R is the same as above.

An MQ resin is a copolymer having $R_3SiO_{\frac{1}{2}}$ and $SiO_{4/2}$ units in a number ratio of $R_3SiO_{\frac{1}{2}}$ to $SiO_{4/2}$ units of from about 0.25 : 1 to about 2 : 1. MDQ resins are copolymers having $R_3SiO_{\frac{1}{2}}$ units, $R_2SiO$ units and $SiO_{4/2}$ units, wherein the ratio of $R_3SiO_{\frac{1}{2}}$ to $SiO_{4/2}$ units is about 0.25 : 1 to about 0.8 : 1 and the ratio of $R_2SiO$ units to $SiO_{4/2}$ units can be up to about 0.1 : 1.

The silicone resins preferably contain from about 0 to 30% by weight of alkoxy functional groups, such as the methoxy or ethoxy functional groups. It is preferred that the silicone resins contain less than about 10% by weight of hydroxyl groups. Silicone resins and processes for preparing the same are described in U.S. Pat. No. 3,919,344 to Merrill et al., U.S. Pat. No. 4,605,446 to Osozaki and U.S. Pat. No. 4,935,484 to Wolfgruber et al.

Preferably the silicone resins have a viscosity of from about 10 to 20,000 mPa·s and more preferably from about 500 to 10,000 mPa·s at 25° C.

The amount of silicone fluids employed in the polishes of this invention may range from 0 to 74.5% by weight and preferably from 1 to 25% by weight based on the weight of the composition.

Surfactants which may be employed in the compositions of this invention are those surfactants which are suitable for preparing polish emulsions. Generally the surfactant can be cationic, anionic, or non-ionic, with the particular surfactant or combination of surfactants adjusted by those skilled in the art to provide the desired emulsion characteristics. Suitable cationic surfactants include mono and diglycerides of edible fats and oils; sorbitan fatty acid esters, such as sorbitan monooleate, sorbitan monolaurate, sorbitan monopalmitates, sorbitan monostearate, sorbitan dioleate, sorbitan tristearate, sorbitan trioleate, etc.; polyoxyalkylene sorbitol fatty acid esters, such as polyoxyethylene sorbitan monolaurate, monopalmitate, monostearate, monooleate, trioleate, etc.; polyoxyalkylene sorbitol esters, such as polyoxyethylene sorbitol oleate, laurate, etc.; polyoxyethylene acids, such as polyoxyethylene stearates, polyoxyethylene palmitates, polyoxyethylene laurates, etc.; polyoxyalkylene ethers, e.g., polyoxyethylene lauryl ether, cetyl ether, stearyl ether, olelyl ether, tridecyl ether, etc.; polyoxyethylene fatty glycerides; polyoxyalkylene alkyl amines; N-certyl-N-ethylmorpholinium ethosulfates; N-soya-N-ethylmorpholium ethosulfates; alkylaryl sulfonates; quaternary amine acetates; polyoxyethylene nonyl phenols; sodium dioctylsulfosuccinates; morpholine oleate; triethanolamine stearic acid salts; etc. In some cases, where the surfactant is a salt, such as a salt of an amine, the amine and the acid portion of the amine salt are added separately to the reaction mixture or are added as separate components of the reaction mixture and the amine salt surfactant is formed in situ. Thus, where the surfactant is a material such as morpholine oleate, the oleic acid is added separately from the morpholine to produce the surfactant.

The amount of surfactant employed in the composition of this invention is not critical and may range from at least 0.5 to 6% by weight preferably at least 1% by weight and more preferably from 1 to 5% by weight based on the weight of the polish composition.

The compositions of this invention containing hydrocarbonoxy end-blocked branched organopolysiloxanes and surfactant may be combined with other ingredients to form polish compositions.

Examples of other ingredients which may be employed in the polish compositions are waxes and abrasive materials.

Examples of suitable waxes which may be employed are montan wax, carnauba, candelilla, ouricury, beeswax and synthetic waxes such as ozocerite, polyethylene waxes and paraffin waxes including microcrystalline and oxidized paraffins. In general, it is preferred that a wax be present in an amount of from 0 to 10% by weight and more preferably from 1 to 8% by weight based on the weight of the polish composition.

Although only one type of wax may be employed, it is possible to use two or more different types of waxes in the polish composition.

The polish composition may also contain finely divided abrasive materials which have been or could have been employed heretofore in polish compositions. Examples of suitable abrasive materials are diatomaceous earths, Neuberg chalk, amorphous silica and aluminum silicates. Generally, the amount of abrasive materials may range from 0 to 12% by weight and more preferably from 1 to 10% by weight based on the weight of the polish composition.

It has been found that when abrasive materials are employed in the polish composition of this invention, that the ease of ruboff of the dried polish film is enhanced by the addition of an organohydrocarbonoxysilane of the general formula $R_nSi(OR')_{4-n}$ where R, R' and n are the same as above.

Examples of silanes which may be employed are the same examples as the organohydrocarbonoxysilanes specified above.

The amount of silane which is necessary to enhance the ruboff properties of the polish composition ranges from about 0.05 to 1% preferably at least 0.05% and more preferably from about 0.1 to about 0.8% by weight based on the polish composition.

The silane may be added to any of the ingredients of the polish composition or added after the polish composition has been prepared. Preferably the silane is mixed with the alkoxy branched organopolysiloxane before the other ingredients are added to the polish composition.

One or more of the conventional thickening agents may be employed, if desired. These are, of course, not necessary where the composition is a solvent dispersion. Among the thickening agents which may be used are, for example, sodium carboxymethyl cellulose and carboxy vinyl polymers such as the methyl vinyl ether maleic anhydride resins, ethylene maleic anhydride resins, natural gums and colloidal magnesium silicate.

The amount of water employed in the polish composition of this invention may vary over a wide range. For example, the amount of water may range from about 25 to 85% by weight and more preferably from about 30 to 80% by weight based on the weight of the polish composition.

Solvents which may be employed in these compositions are hydrocarbon solvents such as petroleum fractions, for example, petroleum naphtha, kerosene and white spirits. Examples of suitable halogenated hydrocarbon solvents are carbon tetrachloride, perchloroethylene, trichloroethylene and 1,1,2-trichloroethane. The amount of solvent used will, of course, depend on the amount of solids present and on the consistency desired and hence may vary widely. Thus, in a composition which is a solvent dispersion no water is present, while in a water-based emulsion, water may be present in an amount up to about 90% by weight based on the weight of the composition.

Thus, the amount of solvent may range from 0 to about 74.5% by weight and more preferably from 0 to about 50% by weight based on the weight of the polish composition.

Other ingredients which may be added to polish compositions may be added to the polish composition of this invention. Examples of other ingredients which may be added to the polish composition of this invention are dyes, odorants and other ingredients normally used in making automotive polishes.

The polish composition of this invention may be prepared in any suitable manner. For example, the ingredients may be added individually to water at an elevated temperature with high shear. Preferably sufficient agitation and/or shear is applied to disperse the aqueous phase. It is also possible to add a previously prepared oil phase to a water phase in the presence of the alkoxy end-blocked branched organopolysiloxanes. In this process, initially an oil-in-water emulsion may be formed, which will invert upon the mixing in of more of the oil phase to form the emulsion of this invention. In an alternative procedure, a previously prepared water phase may be added to a previously prepared oil phase in the presence of the alkoxy end-blocked branched organopolysiloxane, in which case water-in-oil emulsion will be formed.

In a preferred process, the abrasive is first mixed with the water, then the surfactant and solvent are added with agitation. The mixture is preferably heated to an elevated temperature, about 80° C., and then the wax is added with agitation followed by the addition of the alkoxy terminated branched organopolysiloxane fluid and optionally any other additives.

The polishes of this invention may be prepared at a temperature of from 25° C. to 150° C. and more preferably at a temperature from 50° C. to 125° C. at atmospheric pressure. The emulsions may be prepared in any apparatus which will impart a high shearing effect to the composition. Examples of apparatuses which may be employed are colloid mills and high speed stirrers.

The compositions of this invention have good emulsion stability and can be easily applied to metal substrates, such as automobiles, and rubs out well, yielding a glossy surface. The compositions containing the hydrocarbonoxy end-blocked branched organopolysiloxanes exhibit improved detergent resistance and improved durability.

Detergent resistant tests which have been performed in the following examples are described below:

Detergent Resistant Test Method

A. Panel Description

ACT cold roll steel $4 \times 13 \times 32''$
Paint manufacture: PPG
Base coat: HBAL8555 Black
Clear coat: URC1000
Purchased from Advanced Coatings Technologies, Inc.

B. Application of Polish

The polishes to be compared are applied in about the same amounts (about 0.75 gram) with a cotton cloth and allowed to dry for 45 minutes. After the films have dried they are polished with new cotton cloth. The polished panel is then aged in an oven at 100° C. for one hour.

C. Test for Detergent Resistance
1. Detergent solution
   95% distilled water
   4% potassium tripolyphosphate
   1% Triton X-100 (Rohm & Haas)
2. Washing procedure
   (a) Equipment—Scrub tester, Gardener straight line washability and abrasion machine.
   (b) Polished panels are clamped to washing base and are scrubbed 30 times.
   (c) Panels are washed with tap water and then with distilled water.
   (d) Panels are dried at ambient temperature for 20 minutes.
   (e) Detergent resistant properties
      (1) Contact angle of 25 microliter drop of water is measured using Rame-Hart Goniometer Model 100-10.
      (2) Same number of drops applied to each panel.

In the following examples, all parts are by weight and all viscosities are at 25° C. unless otherwise specified.

Preparation of Alkoxy End-Blocked Branched Organopolysiloxane Fluids

Preparation of an Alkoxy End-Blocked Organopolysiloxane having Units (A) To a three neck flask equipped with a mechanical stirrer, side arm adapter, thermometer, water condenser, single neck collection flask and heating mantle, is added 403.7 parts of a mixture containing OH terminated dimethylpolysiloxanees (viscosity - 65 mPa·s) and cyclic siloxanes having an OH content of 0.83% by weight, 21.4 parts of methyltrimethoxysilane and 0.75 parts of potassium hydroxide and heated three hours at 145° C. About 5.25 parts are distilled off, then the reaction product is cooled to ambient temperature and characterized. It has a viscosity of 350 mPa·s and D:T mol ratio of about 41:1 as determined by $^{29}$Si NMR. The NMR analysis further shows a T:MOCH3 mol ratio of 1:1.35.

Preparation of an Alkoxy End-Blocked Organopolysiloxane Having Units (B) To a three neck flask equipped with a mechanical stirrer, side arm adapter, thermometer, water condenser single neck collection flask and heating mantle; is added 250 parts of a mixture containing OH terminated dimethylpolysiloxanes (viscosity - 65 mPa·s) and cyclic siloxanes having an OH content of 0.83%, 42.1 parts of tetraethylorthosilicate, and 1 part of potassium hydroxide and heated three hours at 150° C. About 9.7 parts of volatiles are distilled off, then the reaction product is cooled to ambient temperature and characterized. It has a viscosity of 20 mPa·s and a D:Q mol ratio of about 25:1 as determined by $^{29}$Si NMR. The NMR analysis further shows a Q:MOC2H5 mol ratio of 1:0.72.

Preparation of Aminofunctional Silicone Fluids (C) To a three neck flask having a nitrogen atmosphere and equipped with a mechanical stirrer and heating mantle, is added 247.5 parts of octamethylcyclotetrasiloxane, 16.5 parts of 2-aminoethyl-3-aminopropyltrimethoxysilane and 0.03 part of potassium hydroxide and heated at 145° C. for four hours. The reaction product is cooled to about 60° C. About 0.03 part of acetic acid is added to neutralize the potassium hydroxide. The neutralized product is filtered. The product has a viscosity of 60 mPa·s and a base equivalent of 0.6 milliequivalent of base per gram of fluid.

(D) To a three neck flask having a nitrogen atmosphere and equipped with a mechanical stirrer and heating mantle, is added 111 parts of octamethylcyclotetrasiloxane, 22.2 parts of 2-aminoethyl-3-aminopropyltrimethoxysilane and 0.02 part of potassium hydroxide and heated at 125° C. for four hours. The reaction product is cooled to about 60° C. About 0.02 part of acetic acid is added to neutralize the potassium hydroxide. The neutralized product is filtered. The product has a viscosity of 20 mPa·s and a base equivalent of 1.5 milliequivalents of base per gram of fluid.

(E) To another three neck flask, having a nitrogen atmosphere, is added 100 parts of the aminofunctional fluid prepared in (D) above, 150 parts of OH terminated dimethylpolysiloxane having a viscosity of 20,000 mPa·s, 50 parts of isopropyl alcohol and 200 parts of odorless mineral spirits. The reaction mixture is mixed for one hour. The resultant product has a viscosity of 150 mPa·s and a base content of 0.3 milliequivalent of base per gram of fluid.

(F) To a three neck flask having nitrogen atmosphere and equipped with a mechanical stirrer and heating mantle, is added 142.1 parts of octamethylcyclotetrasiloxane, 2.2 parts of 2-aminoethyl-3-aminopropyltrimethoxysilane and 0.02 part of potassium hydroxide and heated at 145° C. for four hours. The reaction product is cooled to about 60° C. About 0.02 part of acetic acid is added to neutralize the potassium hydroxide. The neutralized product is filtered. The resultant product has a viscosity of 325 mPa·s and a base equivalent of 0.14 milliequivalent of base per gram of fluid.

EXAMPLE 1

A polish composition is prepared by mixing 52.8 parts of aluminum silicate with 71.6 parts of distilled water and heated to about 80° C. The resultant mixture is stirred for about 10 minutes, then 4 parts of morpholine and 4.4 parts of oleic acid are added and mixed for about 5 minutes. About 34 parts of petroleum solvent and 23.2 parts of kerosene are added to the mixture and agitated about 5 minutes before 13.5 parts of Hoechst wax-S (available from Hoechst AG) are added with stirring for an additional 15 minutes. About 16 parts of the alkoxy end-blocked organopolysiloxane fluid (A) above and 4 parts of a trimethylsiloxy end-blocked dimethylpolysiloxane having a viscosity of 10,000 mPa·s are added to the mixture with stirring for an additional 5 minutes. About 175.6 parts of petroleum solvent are then added and the resultant composition mixed for an additional 5 minutes. The resultant polish composition is applied to five panels and tested for durability in accordance with the above test procedure. The results are shown in Table I.

COMPARISON EXAMPLE $V_1$

The procedure of Example 1 is repeated, except that 16 parts of a trimethylsiloxy end-blocked dimethylpolysiloxane having a viscosity of 350 mPa·s are substituted for the alkoxy end-blocked branched organopolysiloxane (A). The results are shown in Table I.

COMPARISON EXAMPLE $V_2$

The procedure of Example 1 is repeated, except that 9.3 parts of aminofunctional silicone fluid (C) and 14.2 parts of aminofunctional silicone fluid (D) are substituted for the alkoxy end-blocked branched organopolysiloxane (A). The results are shown in Table I.

COMPARISON EXAMPLE $V_3$

To freshly scrubbed and cleaned panels are placed sequentially ten 25 microliter drops of deionized water. After the placement of each drop the contact angle is measured. The average contact angle is 79°. The panels are then washed in accordance with the procedure described in the procedure for determining the durability of the composition. The average contact angle is 78.8°. This example shows that scrubbing the panels does not significantly effect the contact angle of the unpolished panels. The results are shown in Table I.

EXAMPLE 2

The procedure of Example 1 is repeated, except that 16 parts of the alkoxy end-blocked branched organopolysiloxane (B) are substituted for the alkoxy end-blocked branched organopolysiloxane (A). The results are shown in Table I.

EXAMPLE 3

The procedure of Example 1 is repeated, except that 18 parts of the alkoxy end-blocked branched organopolysiloxane (A) and 2 parts of petroleum solvent are substituted for the 16 parts of alkoxy end-blocked branched organopolysiloxane (A) and 4 parts of the trimethylsiloxy dimethylpolysiloxane. The results are shown in Table I.

EXAMPLE 4

A polish composition is prepared by mixing, in order, the following ingredients:

| Parts | Ingredients |
|---|---|
| 52.4 | aluminum silicate |
| 166 | deionized water |
| 5.6 | Morpholine |
| 6.0 | oleic acid |
| 23.9 | kerosene |
| 20 | alkoxy end-blocked branched organopolysiloxane (A) |
| 126.1 | odorless mineral spirits |

An oil-in-water emulsion is obtained which is tested in accordance with the procedure described above to determine polish durability. The average contact angle is 83.2°. The results are shown in Table I.

TABLE I

| Polish Composition | Average Contact Angle |
|---|---|
| Example 1 | 88.1 |
| Comparison Example $V_1$ | 74.1 |
| Comparison Example $V_2$ | 79.5 |
| Example 2 | 92 |
| Example 3 | 90.4 |
| Comparison Example $V_3$ (no polish) | 79 |
| Comparison Example $V_3$ after scrubbing | 78.8 |
| Example 4 | 83.2 |

EXAMPLE 5

A polish composition is prepared by adding a mixture containing 78 parts of octamethylcyclotetrasiloxane, 3 parts Witcomide 511, 2.1 parts Bentone 34, 7.5 parts of alkoxy end-blocked branched organopolysiloxane (A) and 7.5 parts of aminofunctional silicone fluid (C) to a mixture containing 30 parts of aluminum silicate and 168.9 parts of water with agitation. About 3.0 parts of propylene glycol are then added and the resultant composition applied to painted panels. The resultant polish exhibited excellent durability after repeated scrubbing.

EXAMPLE 6

The procedure of Example 1 is repeated, except that 20 parts of the alkoxy end-blocked branched organopolysiloxane (A), neutralized with 0.8 part of acetic acid is used and the trimethylsiloxy end-blocked dimethylpolysiloxane is omitted. The resultant composition is applied to painted panels with a cotton cloth and then allowed to air dry for 45 minutes. The ease of rub-off is evaluated using a cotton cloth to remove the dried polish residue. The results are shown in Table II.

EXAMPLE 7

The procedure of Example 6 is repeated, except that the alkoxy end-blocked branched organopolysiloxane (A contains 0.6 part of dimethyldiethoxysilane. The resultant composition is applied to painted panels and the ease of rub-off is determined after drying for 45 minutes. The results are shown in Table II.

EXAMPLE 8

The procedure of Example 7 is repeated, except that 0.6 part of methyltrimethoxysilane is substituted for the dimethyldiethoxysilane. The results are shown in Table II.

TABLE II

| Examples | Application rub-out |
| --- | --- |
| 6 | poor |
| 7 | good |
| 8 | good |

What is claimed is:

1. A detergent resistant composition comprising an aqueous emulsion containing a hydrocarbonoxy end-blocked branched organopolysiloxane consisting of units of the formula $R_2SiO$, and units selected from the group consisting of $RSiO_{3/2}$ units, $SiO_{4/2}$ units, and mixtures thereof, where R is a monovalent hydrocarbon radical and at least 0.5% by weight of a surfactant, based on the weight of the composition.

2. The composition of claim 1, wherein the branched organopolysiloxane contains from 10 to 99 mol percent of units of the formula R2SiO and from 90 to 1 mol percent of units selected from the group consisting of $RSiO_{3/2}$ units, $SiO_{4/2}$ units and mixtures thereof.

3. The composition of claim 1, wherein the mol percent of $RSiO_{3/2}$ units to $SiO_{4/2}$ units ranges from 90 to 0 to 0 to 90 with the proviso that at least one $RSiO_{3/2}$ unit or one $SiO_{4/2}$ unit is present in the organopolysiloxane.

4. The composition of claim 1, wherein the aqueous emulsion contains at least 1% by weight of a surfactant based on the weight of the composition.

5. The composition of claim 1, wherein the aqueous emulsion also contains an aminofunctional silicone fluid.

6. The composition of claim 1, wherein the branched organopolysiloxane is present in the aqueous emulsion in an amount of from 0.5 to 20% by weight, based on the weight of the composition.

7. The composition of claim 1, wherein the composition contains an abrasive material.

8. The composition of claim 1, wherein the composition contains a silane of the formula $R_nSi(OR')_{4-n}$ where each R and R' is a monovalent hydrocarbon radical having from 1 to 18 carbon atoms and n is 0 or 1.

9. The composition of claim 1, wherein the composition contains an organopolysiloxane fluid.

10. The composition of claim 1, wherein the composition contains a silicone resin.

11. The composition of claim 1, wherein the composition contains an organic solvent.

12. The composition of claim 1, wherein the composition contains a hydrocarbonoxy end-blocked branched organopolysiloxane in an amount of from 0.5 to 20% by weight, a surfactant in an amount of at least 0.5% by weight, at least 0.05% by weight of a silane of the formula $R_nSi(OR')_{4-n}$ where each R and R' is a monovalent hydrocarbon radical having from 1 to 18 carbon atoms and n is 0 or 1, an abrasive material in an amount of from 0 to 12% by weight and water in an amount of from 25 to 85% by weight based on the weight of the composition.

13. The composition of claim 1, wherein the hydrocarbonoxy end-blocked branched organopolysiloxane consists of units of the formula

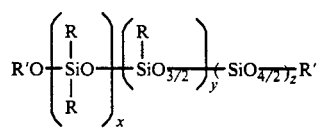

wherein each R and R' is a monovalent hydrocarbon radical having from 1 to 18 carbon atoms, x has a value of from 10 to 1000, y has a value of from 0 to 1000 and z has a value of from 0 to 1000, with the proviso that y+z must be equal to at least 1.

* * * * *